United States Patent
How et al.

(10) Patent No.: US 6,730,235 B2
(45) Date of Patent: May 4, 2004

(54) METHOD AND APPARATUS OF OBTAINING WATER CONDITIONING UTILIZING LOCALIZED HOT ZONE

(76) Inventors: Hoton How, 262 Clifton St., Belmont, MA (US) 02478; Yung-Ching Chu, No. 4, Alley 9, Lane 703, Shi-Yuan St., Da Xi, Tao Yuan (TW)

( * ) Notice: Subject to any disclaimer, the term of this patent is extended or adjusted under 35 U.S.C. 154(b) by 0 days.

(21) Appl. No.: 10/102,053

(22) Filed: Mar. 21, 2002

(65) Prior Publication Data

US 2003/0178352 A1 Sep. 25, 2003

(51) Int. Cl.[7] .............................. A01K 63/04; C02F 1/02
(52) U.S. Cl. ..................... 210/774; 210/169; 210/175; 210/181
(58) Field of Search ............................ 210/169, 175, 210/181, 416.2, 774; 119/261, 262

(56) References Cited

U.S. PATENT DOCUMENTS

| | | | | |
|---|---|---|---|---|
| 2,510,427 A | * | 6/1950 | Soucie | 417/207 |
| 3,059,091 A | * | 10/1962 | Wenzel | 119/256 |
| 3,617,701 A | * | 11/1971 | Volker | 392/503 |
| 3,719,278 A | * | 3/1973 | Kolfertz | 210/169 |
| 3,731,058 A | * | 5/1973 | Bleiweiss | 219/523 |
| 4,077,877 A | * | 3/1978 | Orensten et al. | 210/615 |
| 4,081,377 A | * | 3/1978 | Carrington | 210/169 |
| 4,151,810 A | * | 5/1979 | Wiggins | 119/262 |
| 4,152,263 A | * | 5/1979 | Goldman et al. | 210/169 |
| 4,520,940 A | * | 6/1985 | Boyd et al. | 220/627 |
| 4,528,940 A | * | 7/1985 | Litzburg | 119/248 |
| 5,139,659 A | * | 8/1992 | Scott | 210/169 |

FOREIGN PATENT DOCUMENTS

| | | | |
|---|---|---|---|
| JP | 3-188999 | * | 8/1991 |
| JP | 9-117235 | * | 5/1997 |
| JP | 10-62268 | * | 3/1998 |

* cited by examiner

*Primary Examiner*—Fred G. Prince

(57) ABSTRACT

Disclosed is a method and an apparatus enabling water-conditioning processes to be performed using a heater initially equipped with an aquarium tank for the purpose of supplying heat. Instead of allowing heat to propagate globally, reactor housing is introduced in the tank enclosing the heater so as to form a localized hot zone. The temperatures of the hot zone are maintained at high degrees sufficient to initiate various water-conditioning processes with efficiency, including alga control, ammonia control, water-hardness control, and sterilization. The construction of the reactor housing is simple and inexpensive, and its geometry is compatible to a heater which can be purchased commercially. In short, multiple functions are added to a heater installed in an aquarium, performing water-conditioning processes in addition to the basic task of supplying heat, allowing water quality of the aquarium to be improved and maintained.

5 Claims, 1 Drawing Sheet

Figure 1:
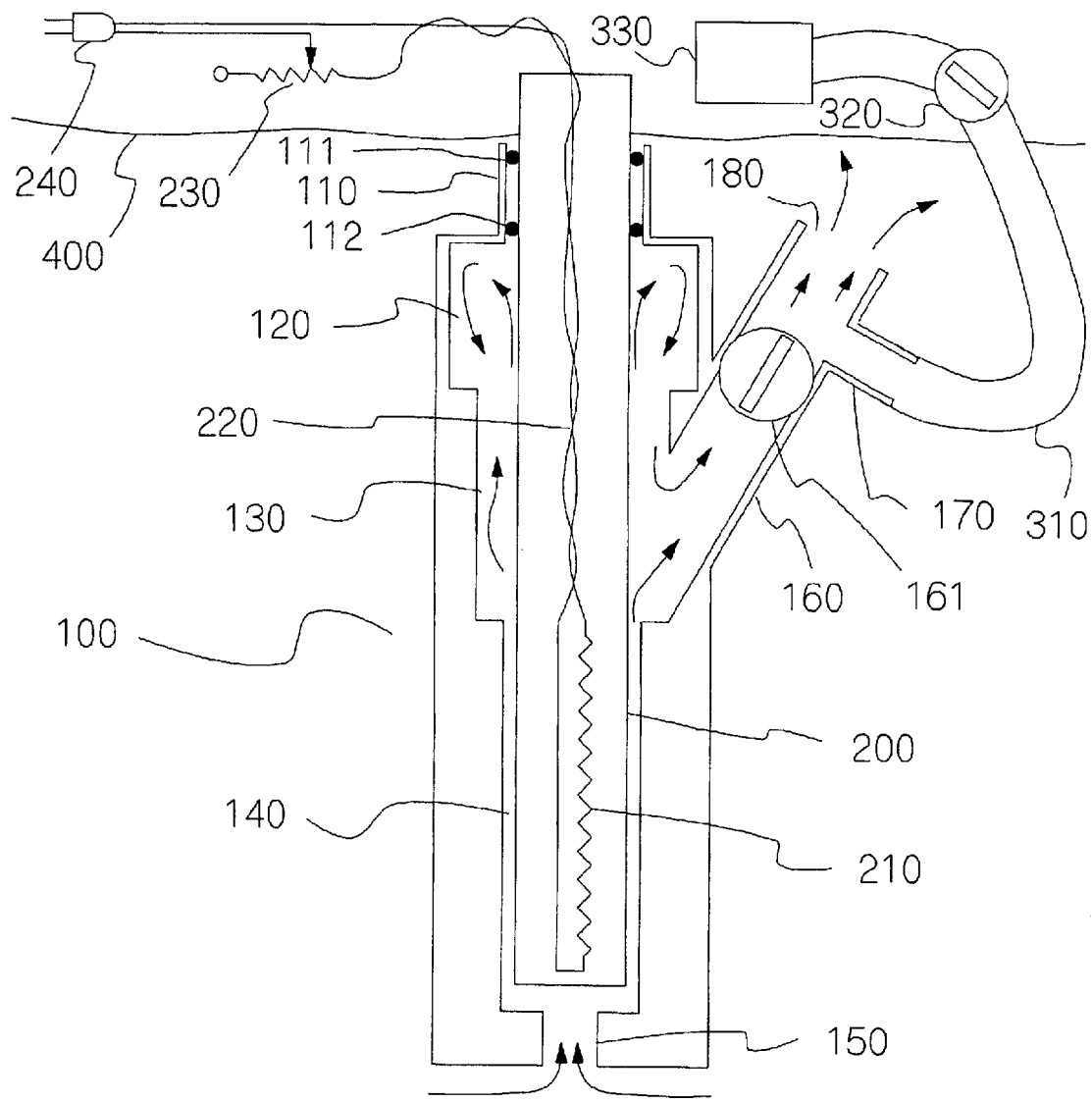

METHOD AND APPARATUS OF OBTAINING WATER CONDITIONING UTILIZING LOCALIZED HOT ZONE

BACKGROUND

1. Field of Invention

This invention is directed to a method and an apparatus to obtain water conditioning utilizing a localized hot zone. By making use of a conventional heater installed with an aquarium tank a localized hot zone can be established, making it possible to perform other tasks to improve and maintain water quality of the aquarium, including water softening, decreasing ammonia content, alga controlling, and sterilizing.

2. Prior Art

A heater is generally used in an aquarium tank to raise water temperatures to relatively high degrees so as to keep the enclosed fish and invertebrates happy and healthy. More precisely, the prior art considers the heater to be an instrument whose function is merely to supply heat to an aquarium tank. Other tasks required under water-conditioning purposes are deemed by the prior art as irrelevant to the role of a heater, such as water softening, alga control, sterilization, and the de-ammonia process. Even by employing other instruments available in the current markets the aforementioned water-conditioning tasks are nevertheless difficult to perform. To lower total hardness of tank water ion-exchange resins may be used, but at elevated costs. To sterilize water UV irradiation can be employed, requiring care to be exercised at the same time. To obtain alga control one has to lower the nutrition level in the water plus reducing the lighting conditions. The only efficient way to decrease the ammonia content in an aquarium tank is to insist on frequent water change. Ozone may be used to perform both alga control and sterilization, however, excessive dose can be harmful to fish as well as to humans. Simple, efficient, and economic instrumentation performing water conditioning tasks in an aquarium tank is thus still lacking by the prior art.

OBJECTS AND ADVANTAGES

Accordingly, it is an object of the invention to address one or more of the foregoing disadvantages or drawbacks of the prior art, and to provide such an improved method and apparatus to obtain water conditioning via the use of a heater. That is, water-conditioning tasks can be performed simultaneously by using the same heater instrument supplying heat to the aquarium tank. By establishing a localized hot zone, water conditioning processes, such as to soften water hardness, to sterilize, to reduce the ammonia content, and to control the population of microalgae, can be thereof initiated, thereby rendering an effective use of the heater instrument.

Other objects will be apparent to one of ordinary skill, in light of the following disclosure, including the claims.

SUMMARY

In one aspect, the invention provides a method which sets up a localized hot zone in an aquarium via the use of a heater contained in the prior art. The temperatures at hot zone reach barely the boiling points of water, thereby enabling a plurality of water-conditioning processes to take place with efficiency and effectiveness, including alga control, sterilization, ammonium de-ionization, and water softening.

In another aspect, the invention discloses an apparatus which allows a heater instrument contained in the prior art to provide additional services to an aquarium tank, besides performing the basic task supplying heat to the aquarium. A localized hot-zone is thus established in the aquarium so as to enable the other beneficial processes on water conditioning to occur, such as sterilization, water softening, ammonium de-ionizing, and alga control.

DRAWINGS

FIGURE

For a more complete understanding of the nature and objectives of the present invention, reference is to be made to the following detailed description and accompanying drawing, which, though not to scale, illustrate the principles of the invention, and in which:

FIG. 1 shows one example of the preferred embodiment of the invention that a conventional heater is included in reactor housing to create hot zone and steam zone, thereby initiating the intended beneficial processes on water conditioning. The ejected hot water may be stirred vigorously via the use of an air line to facilitate the release of gaseous ammonia molecules.

| Reference Numerals | |
|---|---|
| 100 | Reactor Housing |
| 110 | Collar |
| 111, 112 | O-Ring |
| 120 | Steam Zone |
| 130 | Intermediate Zone |
| 140 | Hot Zone |
| 150 | Water Inlet |
| 160 | Nozzle |
| 161 | Valve |
| 170 | Air Inlet (Optional) |
| 180 | Water Outlet |
| 200 | Heater |
| 210 | Heater Resistor |
| 220 | Heater Cable |
| 230 | Temperature Controller |
| 240 | Power Plug |
| 310 | Air Tube |
| 320 | Air Valve |
| 330 | Air Pump |
| 400 | Water Surface |

DETAILED DESCRIPTION

Background

Tropical fish including fresh water and marine species, are the most popular pets in United States today. Of every three households in the US one has at least some types of pet fish, and with over 200 million fish sold in 1998 their popularity continues to grow. However, unless one is contented with the least demanding creature such as a goldfish or a snail, raising fish is not a trivial task, which requires knowledge and equipments to proceed. Water quality is hard to maintain in an aquarium tank, especially in a crowded environment under over-feeding conditions. High-quality water is required by marine invertebrates and by some delicate fresh-water fishes such as discus. There is a need to develop simple, inexpensive, and efficient methods and apparatuses admitting effective water conditioning processes to be performed in a basic setup.

A heater is generally included with an aquarium tank to maintain water temperatures at relatively constant degrees, falling in the range between, say, 78 to 86° F. However, as demonstrated in the following example of the preferred embodiment of the present invention, it is possible to establish a localized hot zone by using the same heater instrument installed in the aquarium, enabling the various beneficial water-conditioning processes to take place, as described separately as follows:

Reducing Water-Hardness:

Hardness is a general term used to describe the total amount of minerals dissolved in water and is most generally applied to describe freshwater. If the tap water is hard, there are a lot of minerals in it, usually calcium carbonate ($CaCO_3$), which causes hard white precipitates to build up around faucets. Soft water lacks high levels of dissolved minerals. Freshwater that has less than 75 parts per million (ppm) hardness is considered soft water. Some delicate freshwater fish such as discus requires very soft water to thrive, which is generally not attainable from tap water. In order to raise these gorgeous freshwater fish ion-exchange resins are often used to remove mineral ions from freshwater so as to reduce water hardness. However, ion-exchange resins are expensive. It is thus desirable if there is a simple method and apparatus capable of softening freshwater with efficiency and economy. This forms the first application of the present invention.

It is well known that calcium carbonate and other dissolved minerals start to participate if water temperature is raised, and when the boiling point is approached, water becomes completely soft, forming the so-called distilled water. Thus, by establishing a localized hot zone inside the aquarium with temperature approaching the boiling point of water, mineral ions nearby can be effectively removed. By continuously circulating the whole aquarium water through the localized hot zone total water hardness can thus be reduced, thereby softening the aquarium water as intended.

Sterilization:

Traditionally, aquarium sterilization is performed via the use of an ultraviolet (UV) lamp: By forcing water to flow through a small window exposing to UV irradiation, larvae of the parasites can thus be killed. However, operation of an UV lamp needs frequent attention and maintenance, and the UV window needs to be cleaned diligently to ensure total transmission of the UV light to occur, if performance degradation is to be avoided. Furthermore, an UV sterilizer is expensive. There is thus a need to develop a simple method and apparatus capable of sterilizing aquarium water with efficiency and economy. This forms the second application of the present invention By raising water temperature to considerable high degrees parasites, as well as other unwanted microorganisms such as bacteria and germs, can be killed, rendering the tank sterilized. This sterilization process needs to be performed locally so that temperature elsewhere is not much disturbed, leaving the wanted livestock still alive in the aquarium. That is, by circulating water across a localized hot zone, the unwanted bacteria, germs, and parasites are thus cooked to death. This procedure occurs in a short-time period, because the temperature at the hot zone is so high approaching the boiling point of water. As such, sterilization of an aquarium is obtained at convenience, to be performed by the same heater device supplying heat to the aquarium.

Alga Control.

A localized hot zone can not only remove parasites from the aquarium, but also microalgae floating around in the water. Microalgae are undesirable in an aquarium tank, because microalgae can attach to the glass of the tank to spoil the aesthetic view of the aquarium. Microalgae will grow due to high level of nutrition as well as abundance of light illumination. Ozone may be used to oxidize or burn microalgae. However, over dose of ozone can not only damage the livestock held in the tank, but also be harmful to humans if escaped from water. Otherwise, alga eaters, fish or invertebrates, are kept in the tank to graze/nibble away partially the grown algae; ultimate and thorough clean still relies on human hands to wipe out algae stuck on tank glass and on the surface of gravels deployed at bottom of the tank. However, if a localized hot zone is established in the tank, through constant water circulation, microalgae can be continuously removed from the tank, thereby maintaining the total population of microalgae to a minimum degree. This forms the third application of the present invention.

Reducing Ammonia Concentration:

Ammonia is poison to livestock held in the aquarium, which is the number one killer of fishes and invertebrates. Currently, there is no efficient way in controlling the ammonia content in aquarium water. The only way known to the public is to perform partial water change diligently so as to dilute ammonia concentration. However, via installing a localized hot zone in the aquarium ammonia content can be effectively controlled. For the following chemical reaction $$NH_3(g)+H_2O(l)=NH_4^++OH^-,$$

7290 cal/mole, called heat of solution, will be generated at 25° C. under 1 atmosphere pressure. Thus, by raising the temperature the above equilibrium reaction will shift onto the left and ammonium ion ($NH_4^+$) will be removed from water changing into gaseous ammonia $NH_3$. Thus, by passing the aquarium water through a localized hot zone holding at high temperatures, say, approaching the boiling point of water, ammonium ions are virtually all converted into gaseous ammonia; meanwhile vigorous agitation or stirring of water is employed, facilitating gaseous ammonia to be released to atmosphere, thereby lowering overall content of ammonia in the water. This forms the forth application of the present invention.

Preferred Embodiment: —FIG. 1

FIG. 1 shows an example of the preferred embodiment of the invention that a localized hot zone is established utilizing the same heater instrument supplying heat to the aquarium tank. In FIG. 1 Heater 200 is inserted in Reactor Housing 100 so as to perform the intended water-conditioning processes there. Heater 100 is hung at top of Reactor Housing 100, called Collar 110. This is done via the use of two O-Rings, 111 and 112, not only to support heater attachment, but also to seal water or steam against escaping from Collar 110. As contained in the prior art, Heater Resister 210 is powered through Cable 220 connected to Power Plug 240. The temperature of Heater 200 can be adjusted through Temperature Controller 230, which usually consists of a variable resister, or pot, as shown in FIG. 1. As complied with a commercial heater, Resister 210 and part of Cable 210 are sealed in a glass tube assuming the geometry of a circular cylinder, and Heater 200 can be immersed under water to supply heat to the aquarium. In FIG. 1 the water surface is denoted as 400.

Reactor Housing 100 is made of thermal insulating material, such as a plastic, so as to restrict heat propagation to form a localized hot zone. In FIG. 1 the lower portion enclosed by Reactor Housing 100 is called Hot Zone 140, allowing temperature there to reach barely the boiling point of water. Hot zone 140 is thus surrounded by a thick plastic layer or wall to ensure enhanced thermal insulation. Also, small gap is assumed between Heater 200 and the inner surface of Reactor Housing 100, or Hot Zone 140, implying Hot Zone 140 to fall within a thin-layer region. This facilitates heating of Hot Zone 140. Water vapor or steam, if produced, will rise up directly to the top portion enclosed by Reactor Housing 100, called Steam Zone 120. Instead, Steam Zone 120 assumes a thin plastic layer or wall in surrounding; this allows steam to efficiently cool down, converting back into water and sinking down to the middle portion enclosed by Reactor Housing 100, called Intermediate Zone, 130.

Nozzle 160 is included with Intermediate Zone 130, allowing hot water to exit Reactor Housing 100. That is, Nozzle 160 is tilted toward the upward direction to facilitate water convection. Water convection occurs whenever the density of water changes due to an imposed temperature difference. Valve 161 is installed with Nozzle 160 so as to control the convection flow of water. Thus, water flow circulating inside Reactor Housing 100 results due to thermal convection initiated by Heater 200: Cold water enters Reactor Housing 100 at Inlet 150, being heated up at Hot Zone 140. Water vapor, or stream, if formed, rises to Steam Zone 110, being cooled down there converting back into the liquid phase, or water, then sinking onto Intermediate Zone 120. Hot water in Intermediate Zone 120, coming either from Steam Zone 120 or from Hot Zone 140, convects upward inside Nozzle 160, exiting Nozzle 160 at Outlet 180. By adjusting Valve 161 and the temperature at Hot Zone 140 the aforesaid convection flow of water can thus been controlled. Water flow directions are indicated in FIG. 1.

As mentioned previously, at high temperatures ammonium ion ($NH_4^+$) converts into gaseous ammonia ($NH_3$) dissolved in water. Vigorous agitation of water at Outlet 180 of Nozzle 160 is thus necessary to facilitate release of gaseous ammonia into atmosphere. This is pursued in FIG. 1 by using forced air blowing: Air flow is generated via Air Pump 330, passing through Air Tube 310, and ejected onto Nozzle 160 at Air Inlet 170. Air flow injected thereof can be useful not only to stir water sufficiently to facilitate ammonia release into air, but also to reinforce the convection flow of water induced inside Reactor Housing 100 due to an established thermal gradient there. That is, if the convection flow of water inside Reactor Housing 100 is not strong enough, the flow can be intensified or accelerated via ejection of an air flow, as shown in FIG. 1.

Alternatively, a second water flow can be included near Water Outlet 180 at the same Inlet position 170, conveying cold water to be mixed with hot water exiting Nozzle 160. This can not only intensify the convection flow induced inside Reactor Housing 100, in a manner analogous to the air flow demonstrated in FIG. 1, but also allows the temperature of water exiting Water Outlet 180 to cool down so as not to disturb fish swimming nearby. Of course, incorporation of an air flow or a second cold water flow is optional, and equipments associated with these flows may be omitted in a simple reactor-housing setup, giving rise to a primitive water conditioning device.

Although the top portion enclosed by Reactor Housing 100 is called Steam Zone 120, it is understood that steam is not necessarily to be produced in Hot Zone 140, and hence steam is not necessarily to exist in Steam Zone 120. Water hardness influences mostly fresh-water fishes, but it is of little concern to salt-water fishes and invertebrates. Consequently, in dealing with a salt-water tank water temperatures in Hot Zone 140 may not require excessively high degrees, so as not to produce unnecessary precipitates, as long as the temperature is sufficient to perform the intended water-conditioning processes. Precipitates occurring at the inside surface of Reactor Housing 100 and at the outside surface of Heater 200 need to be cleaned under a regular basis. Cleaning the deposited precipitates can be carried out by rinsing the surfaces in a weak acid solution, such as acetic acid or dilute hydrochloride acid, for examples.

The demonstrated geometry of Reactor Housing 100 shown in FIG. 1 is compatible to the size of a heater which can be purchased commercially intended for aquarium use. Of course, other Reactor Housing geometries can equally be considered, and the Heater element included in FIG. 1 is not necessarily to be restricted to those supplied commercially. However, FIG. 1 clearly demonstrate the working principles that a localized hot zone is established in the aquarium via the use of a heater, permitting other water-conditioning functions to be performed therewith, including alga control, water-hardness control, ammonia control, and sterilization.

Conclusions

Water-conditioning functions can be achieved with the same heater instrument supplying heat to an aquarium tank. This is accomplished via the establishment of a localized hot zone at which area water temperatures are raised to high degrees close to the boiling point. As such, unwanted microorganisms such as microalgae, parasite larvae, germs, etc., can be removed from the tank. Water hardness can be lowered and the de-ammonia process can be activated, rendering improved water quality of the aquarium.

We claim:

1. A method of obtaining water conditioning utilizing a localized hot zone while not harming fish or invertebrates in an aquarium, said method comprising:

providing a heater inside a reactor housing having an inner surface and an inlet, said heater and said inner surface forming a gap;

flowing aquarium water into said reactor housing via said inlet;

setting up said localized hot zone in said gap by raising a local temperature of said aquarium water flowing within said reactor housing to such a degree that unwanted microorganisms are killed, said unwanted microorganisms including bacteria, germs, and parasites;

flowing said aquarium water to other water-conditioning processes;

returning said aquarium water to said aquarium without harming said fish or invertebrates in said aquarium;

wherein by controlling said flow of said aquarium water passing across said localized hot zone in said reactor housing, said other water-conditioning processes can be carried out to sterilize and control the quality of said aquarium water in said aquarium.

2. The method of claim 1 wherein said water-conditioning processes include alga control, ammonia control, water-hardness control, and sterilization.

3. The method of claim 1 wherein said flow of said water passing across said zone in said aquarium can be assisted by incorporating an air flow.

4. The method of claim 1 wherein said flow of said water passing across said zone in said aquarium can be assisted by incorporating a second water flow.

5. In an aquarium water treatment system, a water-conditioning device for treating aquarium water in an aquarium, said device comprising:

an adjustable temperature controller;

a reactor housing comprising an inlet and an inner surface;

a heater inside said reactor housing adjacent said inner surface of said reactor housing, said heater and said inner surface forming a gap;

a localized hot zone for killing unwanted microorganisms in said aquarium water, said localized hot zone located in said gap;

means for flowing said aquarium water to water-conditioning processes in said aquarium water treatment system.

* * * * *